(12) United States Patent
Nishiguchi

(10) Patent No.: US 12,010,185 B2
(45) Date of Patent: Jun. 11, 2024

(54) EXPERIENCE SHARING SYSTEM AND EXPERIENCE SHARING METHOD

(71) Applicant: toraru co., ltd., Hyogo (JP)

(72) Inventor: Jun Nishiguchi, Hyogo (JP)

(73) Assignee: TORARU CO., LTD., Hyogo (JP)

( * ) Notice: Subject to any disclaimer, the term of this patent is extended or adjusted under 35 U.S.C. 154(b) by 127 days.

(21) Appl. No.: 17/614,656

(22) PCT Filed: Aug. 8, 2019

(86) PCT No.: PCT/JP2019/031375
§ 371 (c)(1),
(2) Date: Nov. 29, 2021

(87) PCT Pub. No.: WO2020/240879
PCT Pub. Date: Dec. 3, 2020

(65) Prior Publication Data
US 2022/0272164 A1    Aug. 25, 2022

(30) Foreign Application Priority Data
May 30, 2019 (JP) ................... 2019-101810

(51) Int. Cl.
*H04L 67/52* (2022.01)
*H04L 67/50* (2022.01)
*H04L 67/60* (2022.01)

(52) U.S. Cl.
CPC ............. *H04L 67/50* (2022.05); *H04L 67/52* (2022.05); *H04L 67/60* (2022.05)

(58) Field of Classification Search
CPC ......... H04L 67/50; H04L 67/52; H04L 67/54; H04L 67/55; H04L 67/56; H04L 67/563; H04L 57/565; H04L 57/567
(Continued)

(56) References Cited

U.S. PATENT DOCUMENTS

| 9,338,622 B2* | 5/2016 | Bjontegard ........... A63F 13/216 |
| 2004/0054609 A1 | 3/2004 | Takahashi |

(Continued)

FOREIGN PATENT DOCUMENTS

| CA | 2851809 A1 * | 1/2013 | ............. A47K 3/281 |
| CA | 3053957 A1 * | 8/2018 | ......... G06F 21/6245 |

(Continued)

OTHER PUBLICATIONS

Extended European Search Report issued Jan. 9, 2023 in European Patent Application No. 19931160.6.
(Continued)

*Primary Examiner* — Khanh Q Dinh
(74) *Attorney, Agent, or Firm* — WENDEROTH, LIND & PONACK. L.L.P.

(57) ABSTRACT

An experience sharing system is configured to share an experience between a request user terminal and an execution user terminal. The experience sharing system includes an accepter, an experience sharing determiner, an information acquirer, and a distributor. The accepter is configured to accept each of request information related to a request of the experience from the request user terminal and execution information related to performing the experience from the execution user terminal. The experience sharing determiner is configured to determine the experience to be shared between the request user terminal and the execution user terminal based on the request information and the execution information. The information acquirer is configured to acquire shared information when the shared information including a voice or an image to share the experience is acquired by the execution user terminal. The distributor is configured to distribute the shared information to the request user terminal.

16 Claims, 8 Drawing Sheets

(58) Field of Classification Search
USPC .................. 709/203, 220, 224, 226, 227
See application file for complete search history.

(56) References Cited

U.S. PATENT DOCUMENTS

| | | | | |
|---|---|---|---|---|
| 2013/0073374 | A1* | 3/2013 | Heath | G06Q 30/02 |
| | | | | 705/14.39 |
| 2014/0019867 | A1* | 1/2014 | Lehtiniemi | G06Q 50/01 |
| | | | | 715/738 |
| 2014/0289073 | A1* | 9/2014 | Gold | G06Q 30/0639 |
| | | | | 705/26.9 |
| 2015/0262208 | A1* | 9/2015 | Bjontegard | G06Q 30/0205 |
| | | | | 705/7.31 |
| 2015/0366518 | A1* | 12/2015 | Sampson | A61B 5/7264 |
| | | | | 600/509 |
| 2016/0219338 | A1* | 7/2016 | Wang | H04N 21/4782 |
| 2016/0337505 | A1* | 11/2016 | Bjontegard | A63F 13/332 |
| 2016/0337506 | A1* | 11/2016 | Bjontegard | H04L 67/306 |
| 2016/0337827 | A1* | 11/2016 | Bjontegard | H04W 4/185 |
| 2017/0150197 | A1 | 5/2017 | Zograbian | |
| 2018/0268072 | A1* | 9/2018 | Rathod | G06F 16/248 |
| 2019/0073722 | A1* | 3/2019 | Obradovic | G06Q 50/01 |
| 2019/0215694 | A1* | 7/2019 | Rubin | H04W 4/90 |
| 2021/0141770 | A1* | 5/2021 | Wang | G06F 16/185 |
| 2021/0248706 | A1* | 8/2021 | Huke | G06Q 50/34 |
| 2022/0179655 | A1* | 6/2022 | Cheng | G06F 8/441 |

FOREIGN PATENT DOCUMENTS

| | | |
|---|---|---|
| JP | 2005-284676 | 10/2005 |
| JP | 4297193 | 7/2009 |
| JP | 2016-126531 | 7/2016 |
| JP | 2016-200884 | 12/2016 |
| JP | 2017-33419 | 2/2017 |
| WO | 03/100657 | 12/2003 |
| WO | 2013/176687 | 11/2013 |
| WO | 2018/039060 | 3/2018 |

OTHER PUBLICATIONS

International Search Report dated Sep. 3, 2019 in International (PCT) Application No. PCT/JP2019/031375.

* cited by examiner

FIG. 7A

| REQUEST USER ID | NAME | ADDRESS | E-MAIL ADDRESS | REQUEST INFORMATION | | | | |
|---|---|---|---|---|---|---|---|---|
| | | | | LOCATION | TIME | LANGUAGE | COMPENSATION | ... |

FIG. 7B

| EXECUTION USER ID | NAME | ADDRESS | E-MAIL ADDRESS | EXECUTION INFORMATION | | | | |
|---|---|---|---|---|---|---|---|---|
| | | | | LOCATION | TIME | LANGUAGE | COMPENSATION | ... |

FIG. 8A

| LANGUAGE A | XXXXXXXXX XXXX | XXXXXXXXX | ... |
|---|---|---|---|
| LANGUAGE B | Good Morning | Good Afternoon | ... |
| ... | ... | ... | ... |

FIG. 8B

| INSTRUCTION A | RIGHT | ⇧ | ... |
|---|---|---|---|
| INSTRUCTION B | LEFT | ⇩ | ... |
| ... | ... | ... | ... |

EXPERIENCE SHARING SYSTEM AND EXPERIENCE SHARING METHOD

TECHNICAL FIELD

The present invention relates to an experience sharing system and an experience sharing method that share experience between a request user terminal and an execution user terminal communicatively connected via a network.

BACKGROUND ART

Conventionally, as a technique that shares an image between a plurality of terminals that are communicatively connected via a network, or remotely shares a video, a service, or the like, for example, a remote grave visiting system in Patent Document 1 and a method for mediating digital data in Patent Document 2 have been proposed.

Focusing on grave visiting from a remote location, the technique disclosed in Patent Document 1 provides an agency service of grave visiting to share experience without actual visit to a grave. Specifically, selection menus for the grave visiting agency service are provided to a user via the Internet, and an order on the grave visiting agency service selected by the selection menu is received. A real video after performing the grave visiting agency service is provided to a computer of the user. As a result, in grave visiting from the remote location, the user does not need to actually visit the grave at all, and thus agency of the actual grave visiting can be requested via the network. Additionally, since the real video after performing the grave visiting agency service by a grave visiting agency service provider is provided, the user can confirm the completion of the grave visiting agency immediately after that.

Patent Document 2 discloses the technique regarding the mediation method for mediating digital data. In the technique disclosed in Patent Document 2, a photographer accesses a server of a service provider from a terminal and registers photographing availability information. A photography client accesses the server of the service provider from a home terminal to register photography request information. The photography client operates the home terminal and selects a photographer who photographs a photographed subject desired by himself/herself based on the photographing availability information by the registered photographers. The selected photographer photographs, and the recorded video is registered with the server. The photography client receives the video from the server of the service provider. This allows establishing a service in which a request for generation is made to a third person neither an acquaintance nor a friend and the generation request is received from the third person.

Patent Document 1: JP-A-2005-284676
Patent Document 2: Japanese Patent No. 4297193

DISCLOSURE OF THE INVENTION

Problems to be Solved by the Invention

However, while the above-described system described in Patent Document 1 allows confirming the result of the service from the video of the real grave provided after performing the grave visiting agency service without visiting the spot, for example, in a case where there is a point noticed with reference to the provided video or, for example, a surrounding situation is desired to be known, confirmation to a person in charge of the grave visiting agency service is necessary.

This does not cause a problem as long as, for example, a client directly can visit the spot and confirm the site by own eyes, but the client might not have time. Furthermore, for example, in a case where a plurality of people want to visit the spot for confirmation, adjustment with the grave visiting agency service dealer and making a reservation are required again. Although making a phone call to, for example, a manager of the grave for request for confirmation is possible, it has been difficult to confirm, for example, related points to be checked, such as "Please confirm the ○○ too." and "How was around the ○○?" noticed by the client and situations of the periphery and the circumference in real-time.

The above-described method for mediating digital data described in Patent Document 2 is a service in which a client requests a photographer to photograph a desired location desired by himself/herself and a photographed subject via a video mediation service provider and the photographed image photographed by the photographer is provided. In view of this, the photography client side can tell the intension of photographing to the photographer using a preview video transmitted from the photographer by telephone. However, similar to the description above, it is difficult to know a point noticed with reference to the provided image and an object or the like other than the photographed subject reflected in the image.

Furthermore, in the above-described system described in Patent Document 1, the request side requests, for example, the dealer of the agency service. In the digital data mediation method described in Patent Document 2, the request side requests the mediation service dealer and the photographer side to photograph. In view of this, a place unique to the spot that cannot be known by the request side, new information on the spot, attractive experience, or the like was not able to be provided to the client side with images and videos.

Therefore, the present invention has been invented in consideration of the above-described problems, and an object of the present invention is to provide an experience sharing system and an experience sharing method that can share experience in a spot from a remote location.

Solutions to the Problems

An experience sharing system according to a first invention shares experience while a request user terminal and an execution user terminal are communicatively connected via a network. The experience sharing system includes accepting means, experience sharing determining means, information acquiring means, and distributing means. The accepting means accepts each of request information related to a request of the experience from the request user terminal and execution information related to performing the experience from the execution user terminal. The experience sharing determining means determines the request user terminal and the execution user terminal that share the experience based on whether there is a match between pieces of information including at least any of locations and times included in the respective request information and execution information accepted by the accepting means. The information acquiring means acquires shared information including a voice or an image to share the experience between the request user terminal and the execution user terminal determined by the experience sharing determining means from the execution user terminal. The information acquiring means acquires situation information related to a location of the shared information based on the acquired shared information. The distributing means distributes the shared information acquired by the information acquiring means to the request user terminal in real time such that a display of the request user terminal becomes same as a display of the shared information in the execution user terminal. The distributing means distributes the situation information to the execution user terminal in real time such that the situation information is displayed only in the execution user terminal.

In an experience sharing system according to a second invention, which is in the first invention, the information acquiring means acquires state information related to a state of the voice or the image included in the shared information. The distributing means adjusts the voice or the image in the shared information based on the state information acquired by the information acquiring means and distributes the voice or the image to the request user terminal.

In an experience sharing system according to a third invention, which is in the first or second invention, the distributing means distributes identification information related to content of the shared information acquired by the information acquiring means to the request user terminal or the execution user terminal.

In an experience sharing system according to a fourth invention, which is in the first or second invention, the accepting means acquires language information used in the request user terminal or the execution user terminal. The distributing means includes a translating unit that translates the shared information based on the language information acquired by the accepting means and distributes the shared information translated by the translating unit to the request user terminal.

An experience sharing system according to a fifth invention, which is in the first invention, further includes instruction information transmitting means that transmits instruction information including various kinds of instructions to acquire the shared information from the request user terminal to the execution user terminal. The information acquiring means acquires the shared information from the execution user terminal based on the instruction information from the request user terminal.

In an experience sharing system according to a sixth invention, which is in the fifth invention, the instruction information transmitting means transmits instruction information to the execution user terminal. The instruction information includes various kinds of instructions for the request user terminal to perform a direct remote operation to acquire the shared information. The execution user terminal includes an operation control unit. The operation control unit controls an operation to acquire the shared information based on the instruction included in the instruction information transmitted by the instruction information transmitting means.

In an experience sharing system according to a seventh invention, which is in the fifth invention, the instruction information transmitting means transmits instruction information including an instruction related to a time slot to acquire the shared information by the execution user terminal to the execution user terminal. The execution user terminal includes a time slot control unit. The time slot control unit controls the time slot to acquire the shared information based on the instruction related to the time slot included in the instruction information transmitted by the instruction information transmitting means.

In an experience sharing system according to an eighth invention, which is in the fifth invention, the instruction information transmitting means transmits instruction information including an instruction related to a location to acquire the shared information by the execution user terminal to the execution user terminal. The execution user terminal includes a photographing condition control unit. The photographing condition control unit controls a photographing condition to acquire the shared information based on the instruction related to the location included in the instruction information transmitted by the instruction information transmitting means.

In an experience sharing system according to a ninth invention, which is in the first or second invention, when the accepting means accepts the request information in which a condition related to a location and a time at which the experience is shared is described and the execution information in which a location and a time at which the experience is allowed to be performed is described, the experience sharing determining means performs matching of the request user terminal and the execution user terminal based on them and determines the request user terminal and the execution user terminal that share the experience to be shared.

In an experience sharing system according to a tenth invention, which is in the fifth invention, the instruction information transmitting means transmits an instruction related to a time slot to acquire the shared information by the execution user terminal or instruction information including an instruction related to a location to acquire the shared information to the execution user terminal. When the execution user terminal having transmitted the instruction information is determined not to be able to acquire the shared information based on the instruction related to the time slot or the location included in the instruction information, the instruction information transmitting means searches another execution user terminal that allows acquiring the shared information based on the instruction and transmits the instruction information to the other execution user terminal.

An experience sharing system according to an eleventh invention, which is in the first or second invention, further includes distinguishing means and image processing means. The distinguishing means distinguishes a person image, a product image, or a structural image from the shared information including an image acquired by the information acquiring means. The image processing means masks the person image, the product image, or the structural image distinguished by the distinguishing means or pastes a substitution image on a region of the image.

In an experience sharing system according to a twelfth invention, which is in the first or second invention, the accepting means accepts the request information in which a condition including a compensation to be paid for the request is described and the execution information in which a desired compensation for performing the experience is described. The experience sharing determination means determines the request user terminal and the execution user terminal that share the experience based on whether there is a match between the compensations described on the respective request information and execution information accepted by the accepting means. The information acquiring means acquires the shared information after the experience sharing determination means determines the request user terminal and the execution user terminal that share the experience and a payment for the compensation has been made.

An experience sharing method according to a thirteenth invention shares experience between a request user terminal and an execution user terminal communicatively connected via a network. The experience sharing method includes: an accepting step of accepting each of request information related to a request of the experience from the request user terminal and execution information related to performing the experience from the execution user terminal; an experience sharing determining step of determining the request user terminal and the execution user terminal that share the experience based on whether there is a match between pieces of information including at least any of locations and times included in the respective request information and execution information accepted by the accepting step; an information acquiring step of acquiring shared information including a voice or an image to share the experience between the request user terminal and the execution user terminal determined by the experience sharing determining step from the execution user terminal, the information acquiring step acquiring situation information related to a location of the shared information based on the acquired shared information; and a distributing step of distributing the shared information acquired by the information acquiring step to the request user terminal in real time such that a display of the request user terminal becomes same as a display of the shared information in the execution user terminal, the distributing step distributing the situation information to the execution user terminal in real time such that the situation information is displayed only in the execution user terminal.

Effects of the Invention

With the first invention to the thirteenth invention, the accepting means accepts the request information from the request user terminal and the execution information from the execution user terminal. In view of this, a request user can be matched with an execution user. This allows sharing the experience on the spot from a remote location.

With the first invention to the thirteenth invention, the information acquiring means determines the experience shared between the request user terminal and the execution user terminal. In view of this, the shared information including the voice or the image to share the experience can be shared. This allows confirming related points to be checked, situations of a periphery and a circumference, and the like in real-time.

With the first invention, the experience sharing determining means determines the experience shared between the request user terminal and the execution user terminal based on the request information and the execution information. In view of this, the information on the spot can be confirmed even at the remote location. This allows sharing the experience on the spot from the remote location.

With the first invention, the distributing means distributes the acquired shared information to the request user terminal. In view of this, the information on the spot can be confirmed even at the remote location. This allows providing a place unique to the spot that cannot be known by a request side, new information of the spot, attractive experience, or the like to the client with the image and the video.

With the second invention, the information acquiring means acquires the state information related to the state of voice or the image included in the shared information. In view of this, the distributing means can adjust the voice or the image in the shared information. This allows sharing stable and high quality information of the experience on the spot from the remote location.

With the third invention, the distributing means distributes the identification information related to the content of the shared information to the request user terminal or the execution user terminal. In view of this, the request user terminal or the execution user terminal can confirm the detailed information of the content of the shared information. This allows providing a place unique to the spot that cannot be known by the request side or the execution side, new information of the spot, attractive experience, or the like to the client with the image and the video.

With the fourth invention, the distributing means includes the translating unit. This allows translating the shared information. Thus, the translated shared information can be distributed to the request user terminal, and sharing the experience on the spot from the remote location can be further improved.

With the fifth invention, the instruction information transmitting means transmits the instruction information to acquire the shared information to the execution user terminal. This allows confirming the related points to be checked, situations of the periphery and the circumference, and the like in real-time. Thus, sharing the experience on the spot from the remote location can be further improved.

With the sixth invention, the operation control unit controls the operation to acquire the shared information based on the instruction included in the instruction information. In view of this, the instruction information can be transmitted to the execution user terminal. This allows confirming the related points to be checked, situations of the periphery and the circumference, and the like in real-time.

With the seventh invention, the instruction information includes the instruction information related to the time slot to acquire the shared information by the execution user terminal. Thus, the time slot control unit can control the time slot to acquire the shared information. This allows shortening and an extension of the time during which the shared information is acquired.

With the eighth invention, the instruction information includes the instruction information related to the location to acquire the shared information by the execution user terminal. In view of this, the photographing condition control unit can control the photographing condition to acquire the shared information. This allows a photographing control according to the content of the shared information.

With the ninth invention, the request information includes the description of the conditions related to the location and the time at which the experience is shared and the execution information includes the description of the location and the time at which the experience can be performed. In view of this, after the matching of the request user terminal and the execution user terminal, the experience to be shared can be determined. This allows further accurately sharing the experience on the spot from the remote location.

With the tenth invention, the instruction information transmitting means determines the failure of the acquisition of the shared information. In view of this, after another execution user terminal that can acquire the shared information is searched, the instruction information can be transmitted to the other execution user terminal. This allows continuously sharing the experience on the spot from the remote location.

With the eleventh invention, the distinguishing means determines the person image, the product image, or the structural image from the shared information. In view of this, the image processing means can mask the distinguished person image, product image, or structural image, or paste the substitution image on the region of the image. This allows sharing the experience on the spot from the remote location in consideration of privacy and security.

With the twelfth invention, the accepting means accepts the request information in which the condition including the compensation is described and the execution information in which the desired compensation for performing the experience is described. In view of this, the experience to be shared can be determined based on the compensation. Thus, after the payment for the compensation is made, the experience on the spot can be shared from the remote location.

With the thirteenth invention, the experience sharing determining step determines the experience shared between the request user terminal and the execution user terminal based on the request information and the execution information. In view of this, the information on the spot can be confirmed even at the remote location. This allows sharing the experience on the spot from the remote location.

With the thirteenth invention, the distributing step distributes the acquired shared information to the request user terminal. In view of this, the information on the spot can be confirmed even at the remote location. This allows providing a place unique to the spot that cannot be known by the request side, new information of the spot, attractive experience, or the like to the client with the image and the video.

BRIEF DESCRIPTION OF THE DRAWINGS

FIG. 7(a) is a schematic diagram illustrating an example of request information stored in an experience sharing database according to the embodiment, and FIG. 7(b) is a schematic diagram illustrating an example of execution information stored in the experience sharing database according to the embodiment.

FIG. 8(a) is a schematic diagram illustrating an example of a translation data table stored in the experience sharing database according to the embodiment, and FIG. 8(b) is a schematic diagram illustrating an example of an instruction information data table stored in the experience sharing database according to the embodiment.

DESCRIPTION OF PREFERRED EMBODIMENTS

The following will describe an example of experience sharing systems and experience sharing methods of embodiments to which the present invention is applied with reference to the drawings.

Figure 1:
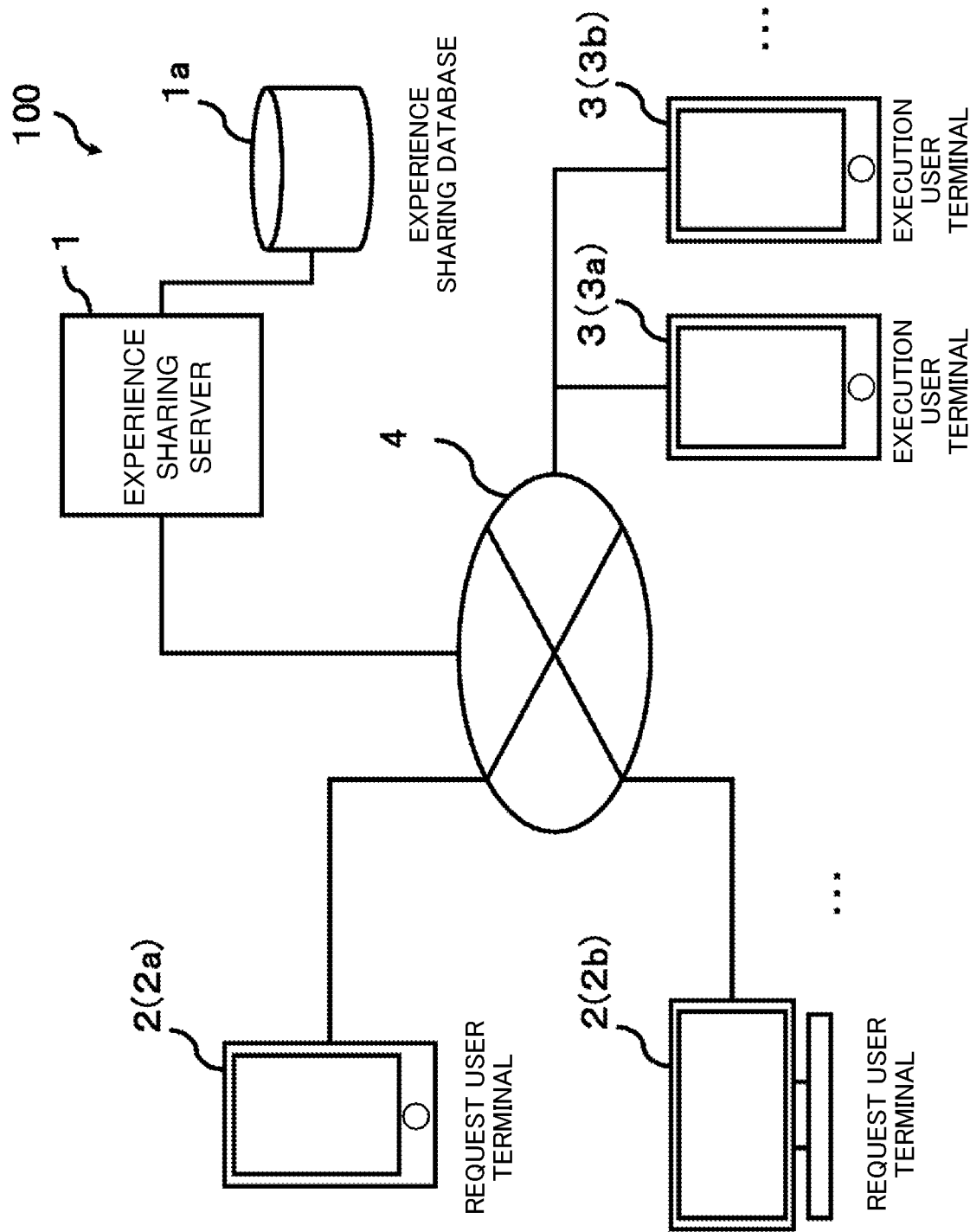
FIG. 1 is a schematic diagram illustrating an example of an experience sharing system according to an embodiment.

With reference to FIG. 1, an example of an experience sharing system 100 and an experience sharing server 1 according to the embodiment will be described.

For example, as illustrated in FIG. 1, the experience sharing system 100 according to the embodiment includes the experience sharing server 1. The experience sharing server 1 includes, for example, a database that stores various kinds of data. For example, the experience sharing server 1 is connected to a plurality of request user terminals 2 (for example, 2a and 2b) via a network 4. The experience sharing server 1 is, for example, connected to a plurality of execution user terminals 3 (for example, 3a and 3b) via the network 4.

Figure 2B:
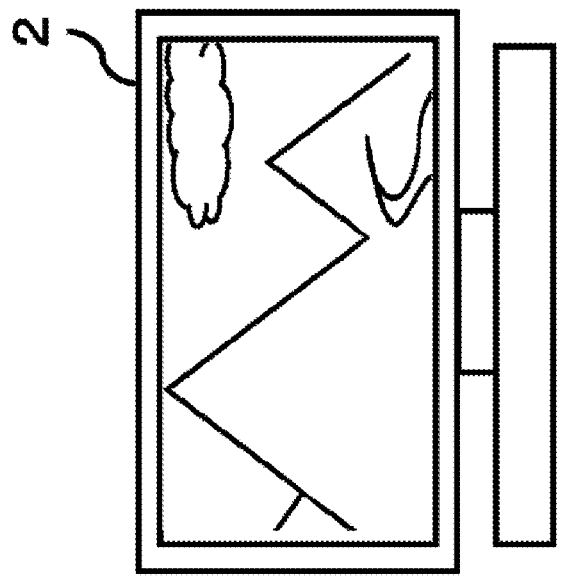
FIG. 2(b) is a schematic diagram illustrating an example of display by a request user terminal according to the embodiment.
Figure 2A:
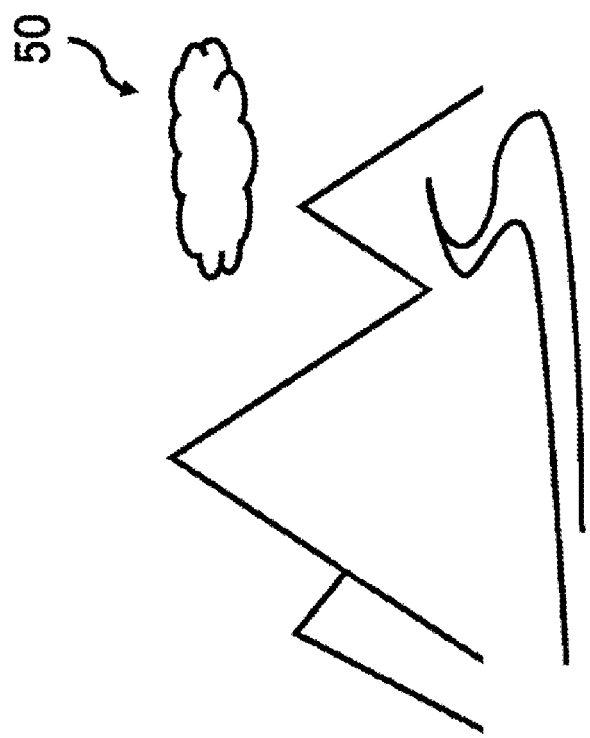
FIG. 2(a) is a schematic diagram illustrating an example of display by an execution user terminal according to the embodiment.
Figure 2A:
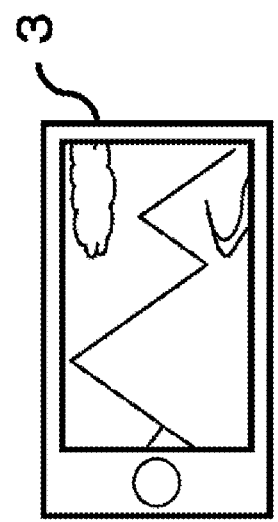

For example, as illustrated in FIG. 2(a) and FIG. 2(b), in the experience sharing system 100, the execution user terminal 3 images a scene 50 at a remote location. The experience sharing server 1 acquires the image of the scene 50 imaged by the execution user terminal 3 as shared information and distributes the image to the request user terminal 2 requested to share the experience. The request user terminal 2 receives the shared information distributed from the experience sharing server 1 and refers to the shared information in a monitor or the like provided in the request user terminal 2. The shared information may be various kinds of data formats of a voice or an image taken by the execution user terminal 3 on the spot and includes information on a location where the shared information is taken. In addition to being taken using the known camera provided in the execution user terminal 3, the shared information may be taken using the known camera independent of the execution user terminal 3.

<Experience Sharing Server 1>

The experience sharing server 1 stores, for example, the above-described various kinds of information. The experience sharing server 1, for example, may accumulate the various kinds of information transmitted via the network 4, for example, store information similar to that in a storage unit 104, and perform transmission and reception of various kinds of information with the experience sharing system 100 via the network 4. That is, the experience sharing system 100 may use the experience sharing server 1 instead of the storage unit 104.

<Request User Terminal 2>

The request user terminal 2 inputs the various kinds of request information that a request user wants to share experience and refers to, for example, the shared information distributed by the distributing unit 14. Mainly a mobile phone (a mobile terminal) is used as the request user terminal 2, and except for that, in addition to an electronic device, such as a smart phone, a tablet terminal, a wearable terminal, a personal computer, and an IoT device, various electronic devices that embody experience may be used. For example, in addition to being connected to the experience sharing system 100 via the network 4, the request user terminal 2 may be directly connected to, for example, the execution user terminal 3.

For example, a plurality of the request user terminals 2 may be used, and in the case, the same shared information may be distributed to the plurality of request user terminals 2. Additionally, the request user terminal 2, for example, may cause one display to display the respective pieces of the shared information from the plurality of execution user terminals 3.

<Execution User Terminal 3>

The execution user terminal 3 inputs the various kinds of execution information of shared experience provided by the execution user terminal 3 on the spot and images, for example, the shared information acquired by an information acquiring unit 13. As long as a device including, for example, an imaging function, the execution user terminal 3 may be any device. For example, mainly a mobile phone (a mobile terminal) is used as the execution user terminal 3, and except for that, in addition to an electronic device, such as a smart phone, a tablet terminal, a wearable terminal, a personal computer, and an IoT device, ones embodied by various electronic devices, such as an imaging robot and a drone, that can remotely perform imaging may be used.

The execution user terminal 3 may be an electronic device including a sensor, and may measure or gauge various kinds of values, such as a distance, location information, a shape, a depth, a size, a material, coloring, a temperature, and infrared, of a photographed subject or an object as an imaging target.

In addition to being connected to the experience sharing system 100, for example, via the network 4, for example, the execution user terminal 3 may be directly connected to the request user terminal 2. An execution user, for example, may use the execution user terminal 3 to acquire the shared information from the experience sharing system 100. When receiving common request information at, for example, a wide place, such as a venue, the execution user terminal 3 may acquire the shared information by the plurality of execution user terminals 3.

<Network 4>

The network 4 is, for example, an Internet network to which the experience sharing system 100 or the like is connected via a communication circuit. The network 4 may be constituted of so-called an optical fiber network. In addition to a wired network, the network 4 may be achieved by the known network, such as a wireless network.

<Experience Sharing Server 1>

Figure 3:
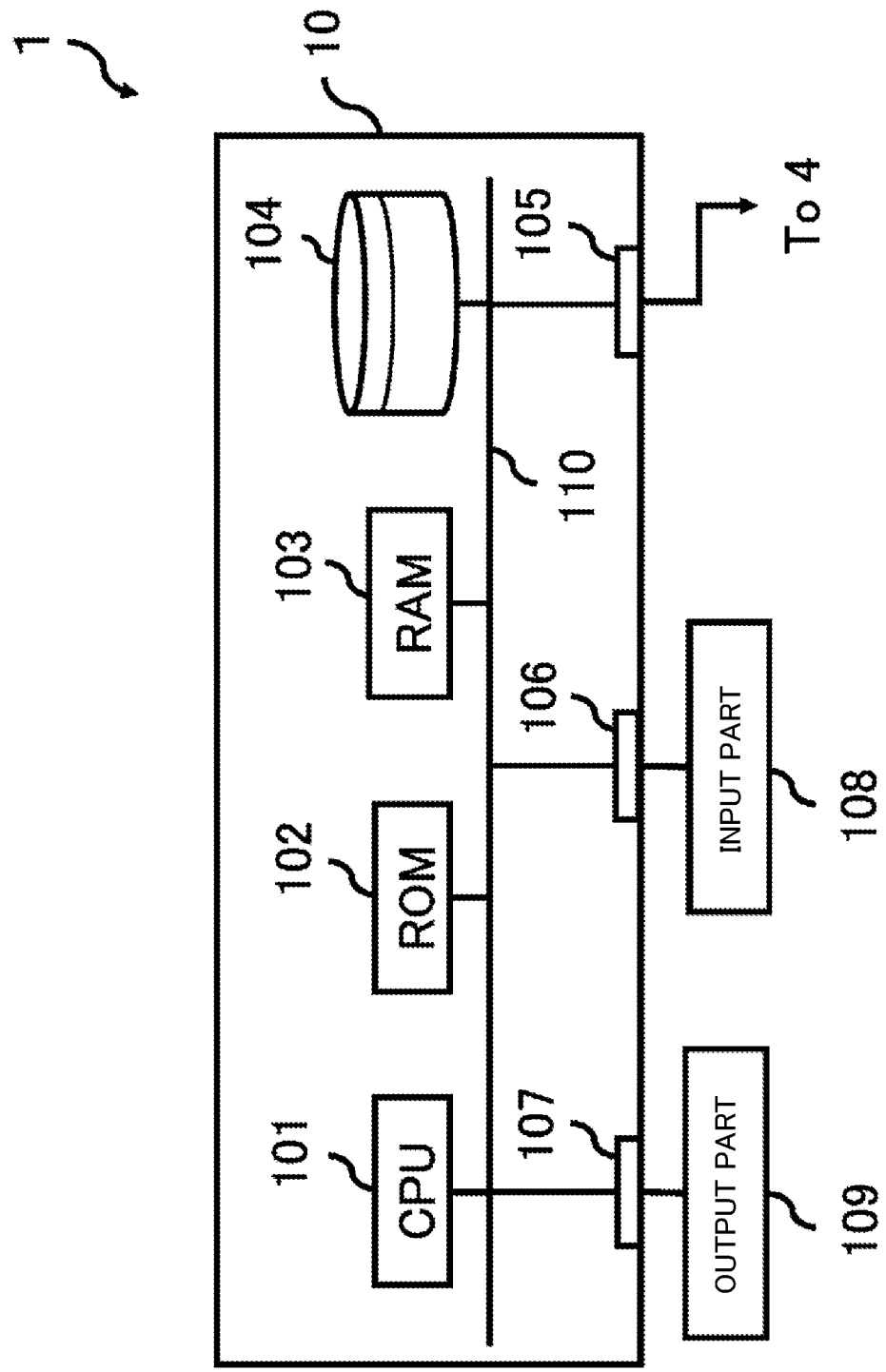
FIG. 3 is a schematic diagram illustrating an example of a configuration of the experience sharing system according to the embodiment.

Next, with reference to FIG. 3, an example of the experience sharing server 1 according to the embodiment will be described. FIG. 3 is a schematic diagram illustrating an example of a configuration of the experience sharing system 100 according to the embodiment.

As the experience sharing system 100, for example, the experience sharing server 1 may be a configuration (not illustrated), such as a client server system and a cloud system, includes a housing 10, a Central Processing Unit (CPU) 101, a Read Only Memory (ROM) 102, a Random Access Memory (RAM) 103, the storage unit 104, and a respective plurality of I/Fs 105 to 107, and the respective configurations are connected with an internal bus 110. The CPU 101 controls the entire experience sharing server 1. The ROM 102 stores an operation code of the CPU 101. The RAM 103 is a working area used during the operation of the CPU 101. The storage unit 104 stores information, such as various kinds of information, such as each spot and location information, in addition to information on the request user and the execution user required to share experience. As the storage unit 104, for example, in addition to a Hard Disk Drive (HDD), a data storage device (not illustrated), such as a Solid State Drive (SSD), a hard disk, or a semiconductor memory, may be used.

The CPU 101 is achieved by executing a program stored in, for example, the storage unit 104 using the RAM 103 as the working area. For example, the experience sharing server 1 may include a Graphics Processing Unit (GPU) (not illustrated). Providing the GPU allows arithmetic processing faster than the usual one.

The I/F 105 is an interface for transmission and reception of the various kinds of information connected via the network 4. The I/F 106 performs transmission and reception of the various kinds of information with, for example, the plurality of request user terminals 2 and the execution user terminal 3 via the network 4. The I/F 107 is an interface for transmission and reception of information of an input part 108. As the input part 108, for example, a keyboard is used, and a manager of the experience sharing server 1 transmits and receives the various kinds of information and inputs, for example, a control command for setting of the various kinds of information via the input part 108. The I/F 107 is an interface for transmission and reception of various kinds of information with an output part 109. The output part 109 outputs various kinds of information stored in the storage unit 104 or, for example, process situations of the request user terminal 2 and the execution user terminal 3. As the output part 109, a display is used, and may be, for example, a touchscreen type.

<Experience Sharing Database 1a>

The storage unit 104 stores the preliminarily acquired various kinds of information. The stored information is, for example, stored in the experience sharing database 1a of the experience sharing server 1 described later.

FIG. 7(a) is a schematic diagram illustrating an example of the request information stored in the experience sharing database according to the embodiment. FIG. 7(b) is a schematic diagram illustrating an example of the execution information stored in the experience sharing database according to the embodiment. FIG. 8(a) is a schematic diagram illustrating an example of a translation data table stored in the experience sharing database according to the embodiment. FIG. 8(b) is a schematic diagram illustrating an example of an instruction information data table stored in the experience sharing database according to the embodiment.

The experience sharing database 1a stores an example of the request information illustrated in FIG. 7(a) accepted by the request user terminal 2, the execution information illustrated in FIG. 7(b) accepted by the execution user terminal 3, the translation data table illustrated in FIG. 8(a), and the instruction information data table illustrated in FIG. 8(b).

Figure 4:
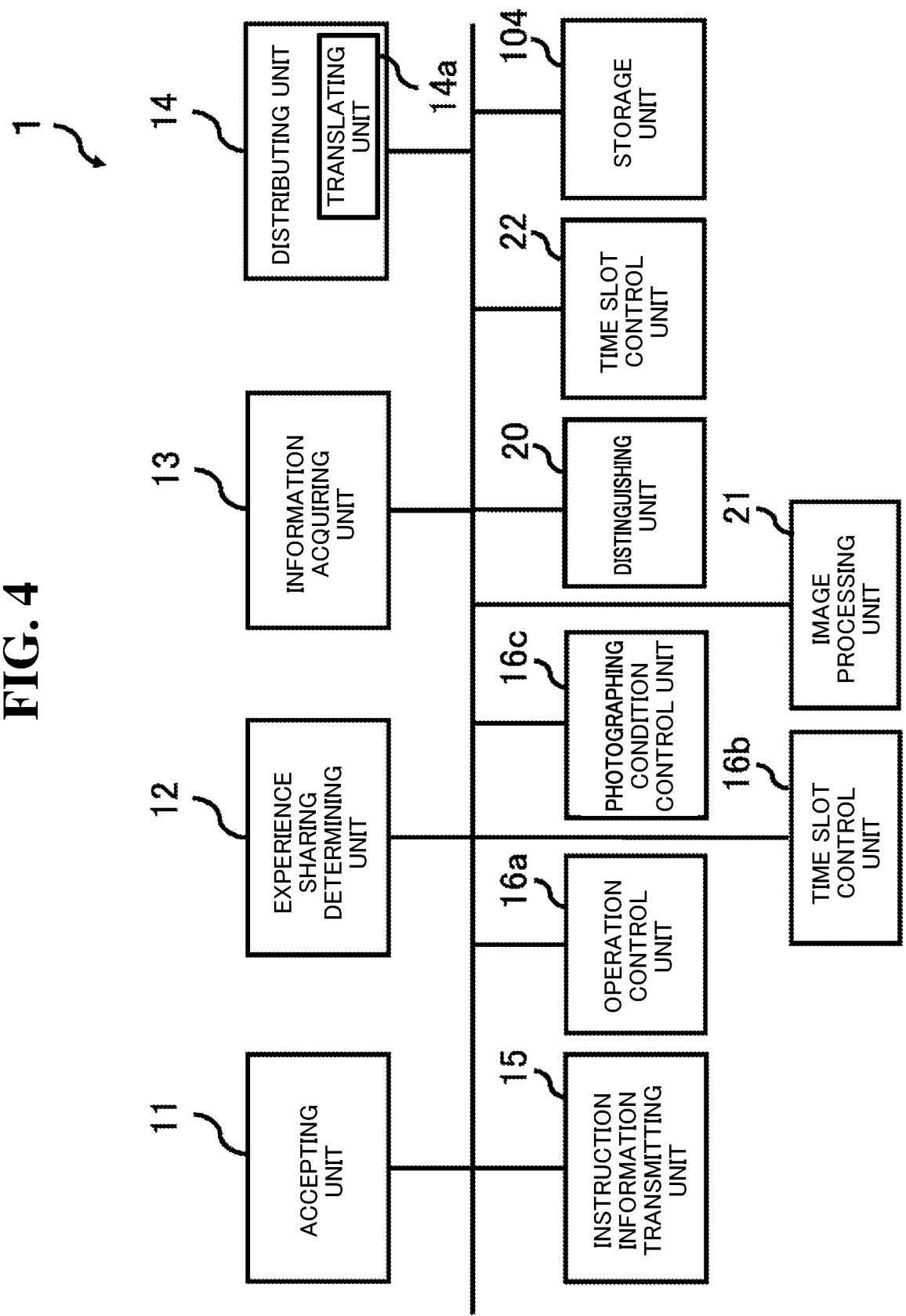
FIG. 4 is a schematic diagram illustrating an example of a functional configuration of an experience sharing server.

FIG. 4 is a schematic diagram illustrating an example of a functional configuration of the experience sharing server 1. The experience sharing server 1 includes an accepting unit 11, an experience sharing determining unit 12, an information acquiring unit 13, a distributing unit 14, a translating unit 14a included in the distributing unit 14, an instruction information transmitting unit 15, an operation control unit 16a, a time slot control unit 16b, a photographing condition control unit 16c, an image processing unit 21, a distinguishing unit 20, an output unit 22, and the storage unit 104, and may include, for example, an updating unit (not illustrated). The respective functions illustrated in FIG. 4 are achieved by execution of the programs stored in the storage unit 104 or the like using the RAM 103 as the working area by the CPU 101, and may be controlled by, for example, an artificial intelligence.

<Accepting unit 11>

The accepting unit 11 accepts the respective request information related to a request for experience from the request user terminal 2 and execution information related to performing the experience from the execution user terminal 3. The accepting unit 11 accepts the request information from the request user terminal 2 and the execution information from the execution user terminal 3 via the network 4 and the I/F 106. Any given frequency and cycle that the accepting unit 11 accepts the request information and the execution information may be used. In response to the request from the request user terminal 2 or the execution user terminal 3, the accepting unit 11 accepts the request information in which conditions including a compensation to be paid are described and the execution information in which the desired compensation for performing the experience is described. Furthermore, the accepting unit 11 accepts the request information in which conditions related to a location and time of sharing experience are described and the execution information in which a location and time at which the experience can be performed are described.

<Experience Sharing Determination Unit 12>

The experience sharing determining unit 12 determines experience shared between the request user terminal 2 and the execution user terminal 3 based on the request information and the execution information accepted by the accepting unit 11. The experience sharing determining unit 12, for example, determines the experience to be shared based on the request information accepted from the request user terminal 2 and the execution information in which the location and the time at which the experience can be performed are described included in each piece of the execution information accepted from the execution user terminal 3 via an application provided by the experience sharing system 100 and a platform provided by a Web or the like. The experience determined by the experience sharing determining unit 12 is stored in the storage unit 104. Further, the experience sharing determining unit 12 determines the experience to be shared based on the compensations described in the respective request information and execution information accepted by the accepting unit 11.

<Information Acquiring Unit 13>

In a case where the execution user terminal 3 acquires the shared information including a voice or an image shared in the experience determined by the experience sharing determining unit 12, the information acquiring unit 13 acquires it. The information acquiring unit 13 acquires the shared information of the experience determined by the request user terminal 2 from the execution user terminal 3 via the network 4 and the I/F 106. The information acquiring unit 13 acquires state information related to a state of the voice or the image included in the shared information.

Here, the state information is state information related to the voice or the image distributed to, for example, the request user terminal 2, and may be information of, for example, a state of the device related to the request user terminal 2 and the execution user terminal 3, states of a radio wave and a packet to be transmitted and received, and further a battery state. The information acquiring unit 13 may further acquire situation information of a situation related to a location, for example, a positional coordinate at which the shared information can be acquired by the execution user terminal 3 and GPS information, identification information, such as a type, a property, a condition, a target, and a coupon related to the content of the shared information, from the experience sharing database 1*a*.

After the experience sharing determining unit 12 determines the experience and the payment for the compensation is made, the information acquiring unit 13 acquires the shared information by the execution user terminal 3.

<Distributing Unit 14>

The distributing unit 14 distributes the shared information acquired from the execution user terminal 3 via the network 4 and the I/F 107 to the request user terminal 2 as if the shared information were seen in real-time. The distributing unit 14 adjusts the voice or the image of the shared information based on the state information acquired by the information acquiring unit 13 and distributes it to the request user terminal 2.

The distributing unit 14 distributes the situation information related to the situation of the location where the shared information is acquired by the execution user terminal 3 to the request user terminal 2 or the execution user terminal 3. In view of this, each of the request user terminal 2 and the execution user terminal 3 can acquire the situation information according to, for example, the location where the shared information has been acquired while remotely sharing the experience.

For example, in the distributing unit 14, the situation of the location distributed to the request user terminal 2 may be, for example, detailed information of description regarding a place where the shared information is acquired, a photographed subject, or the like and added value information, such as coupon information of a shop that has reopened. The situations of the locations, for example, may be preliminarily stored in or registered with the experience sharing database 1*a* and provided based on, for example, an identifier related to the location of the shared information acquired by the execution user terminal 3. The configuration allows providing information not known to an execution person on the spot to the request user.

For example, in the distributing unit 14, the situation information related to the situation of the location distributed to the execution user terminal 3 may be a note (for example, the entrance is danger, with step difference, slipperiness) and a restriction (no trespassing, the admission charge is required) related to a location and a place where the shared information is acquired on the spot. The situation information related to the situations of the locations may be preliminarily registered with, for example, the experience sharing database 1*a*. The distributing unit 14 may perform the provision based on the situation information related to the location of the shared information acquired by the execution user terminal 3. With the configuration, for example, the execution user of the execution user terminal 3 can concentrate on imaging the shared information and can perform or continue the imaging at ease. This allows acquiring the shared information with which the spot can be felt quite real and allows sharing the experience with the request user terminal 2.

The distributing unit 14 distributes the identification information related to the content of the shared information by the execution user terminal 3 to the request user terminal 2 or the execution user terminal 3. The identification information, for example, may be preliminarily stored in or registered with the experience sharing database 1*a*, and detailed description information, the latest product information, various kinds of code information, and the like may be provided based on the identifier regarding the content of the shared information acquired by the execution user terminal 3. Furthermore, the identification information may be appropriately selected and distributed according to a feature and an idea of the execution user who has acquired the shared information and the request user who has requested the experience. This configuration allows distributing the further detailed identification information on the spot and the identification information appropriate for the request user or the execution user.

<Translating Unit 14*a*>

The distributing unit 14 includes the translating unit 14*a*. The translating unit 14*a* translates the shared information acquired by the information acquiring unit 13 based on language information related to a language used by the request user or the execution user acquired by the accepting unit 11. The translating unit 14*a*, for example, may translate an instruction from the request user terminal 2 to the execution user terminal 3 or respective replies from the execution user terminal 3 to the request user terminal 2 in real-time. The translated translation result, for example, in addition to from a text into a text, may be converted from a text into a voice, translated, and distributed from the distributing unit 14.

<Instruction Information Transmitting Unit 15>

The instruction information transmitting unit 15 transmits instruction information including various kinds of instructions to acquire the shared information from the request user terminal 2 to the execution user terminal 3. The instruction information includes the various kinds of instructions for the request user terminal 2 to perform a direct remote operation to acquire the shared information, for example, includes an instruction related to a time slot to acquire the shared information by the execution user terminal and an instruction related to a location for the execution user terminal to acquire the shared information, and the respective pieces of the instruction information are transmitted to the execution user terminal 3. The execution user terminal 3 performs control to acquire the shared information according to the instruction information.

The instruction information transmitting unit 15 transmits the instruction related to the time slot to acquire the shared information by the execution user terminal 3 or the instruction information including the instruction related to the location to acquire the shared information to the execution user terminal 3. When the execution user terminal 3 having transmitted the instruction information is determined not to be able to acquire the shared information based on the instruction related to the time slot or the location included in the instruction information, the instruction information transmitting unit 15 searches another execution user terminal 3 that can acquire the shared information based on the instruction and transmits the instruction information to the other execution user terminal 3. Thus, for example, even when an unanticipated situation, such as a device trouble in the execution user terminal 3 to which the request has been made at first or falling to visit an objective place at first due to a restriction on the spot on the day, occurs on the site, the instruction information transmitting unit 15 can continue sharing the experience with the request user.

<Operation Control Unit 16a>

The operation control unit 16a is included in the execution user terminal 3, and performs control to perform an operation to acquire the shared information based on the instruction (for example, an instruction related to a direction of imaging, such as right and left) included in the instruction information transmitted by the instruction information transmitting unit 15. The instruction information, for example, may be preliminarily made to correspond according to, for example, model information, function information, and UI information between the request user terminal 2 and the execution user terminal 3. Further, an instruction request with a text and an icon may be instructed by being made to correspond to another format (for example, a voice, lighting and flashing of a screen, and a vibration function of a vibration mode). This allows, for example, instructing the remote operation directly from the request user terminal 2 to the execution user terminal 3.

<Time Slot Control Unit 16b>

The time slot control unit 16b is included in the execution user terminal 3, and performs control of the time slot to acquire the shared information based on an instruction related to the time slot included in the instruction information transmitted by the instruction information transmitting unit 15. The instruction information may be, for example, an extension and shortening of a shared period related to the experience preliminarily determined between the request user terminal 2 and the execution user terminal 3 or further may be time designation or the remaining time. This allows efficiently or further deeply enjoying the experience shared between the request user terminal 2 and the execution user terminal 3.

<Photographing Condition Control Unit 16c>

The photographing condition control unit 16c is included in the execution user terminal 3 and performs control of the photographing condition to acquire the shared information based on the instruction related to the location included in the instruction information transmitted by the instruction information transmitting unit 15. The photographing condition control unit 16c, for example, can restrict photographing at a location where the shared information is acquired and restrict imaging at a place where photography is prohibited, and can control the acquisition of an image of, for example, a face of a visitor at a place where many people gather.

<Distinguishing Unit 20>

The distinguishing unit 20 distinguishes a person image, a product image, or a structural image from the shared information including an image acquired by the information acquiring unit 13. Here, the person image is an image related to a person reflected when an object, a scene, or the like on the spot or the site is imaged. The product image is an image related to a product, goods, a craftwork, a facture, or the like reflected when an object, a shop, an inside of the shop, or the like on the spot or the site is imaged. The structural image is an image related to an architectural structure or a construction, such as a house, a structure, a building, a bridge, and a road reflected when an object, a scene, or the like on the spot or the site is imaged. The scene may be an image of, for example, a natural mountain and river.

The distinguishing unit 20, for example, may be achieved by executing target data and a program stored in the storage unit 104 or the like, or, for example, may be controlled by an artificial intelligence. For example, the distinguishing unit 20 may refer to a photographing condition data table (not illustrated) of, for example, a place where imaging is prohibited or an object prohibited to be imaged preliminarily stored in the experience sharing database 1a and distinguish whether the imaging is allowed. This allows preventing imaging of, for example, an individual (a common person and a celebrity), an individually owned house, a product, or natural things, such as a mountain and a river, without permission.

<Image Processing Unit 21>

The image processing unit 21 masks the person image, the product image, or the structural image distinguished by the distinguishing unit 20 or refers to the experience sharing database 1a for a region of the image, acquires a corresponding substitution image, and pastes the acquired substitution image on the shared information.

<Output Unit 22>

The output unit 22 outputs, for example, the acquiring situation of the shared information, situations of various kinds of setting information or the like, the distribution situation by the distributing unit 14, and the result of the translation. The output unit 22 outputs the shared information acquired by the execution user terminal 3 to the output part 109 via the I/F 107, and also transmits the shared information and the related various kinds of information to, for example, the request user terminal 2 or the execution user terminal 3 via the I/F 105 by the distributing unit 14.

(Example of Operations of Experience Sharing System 100)

<Accepting Means S110>

Figure 5:
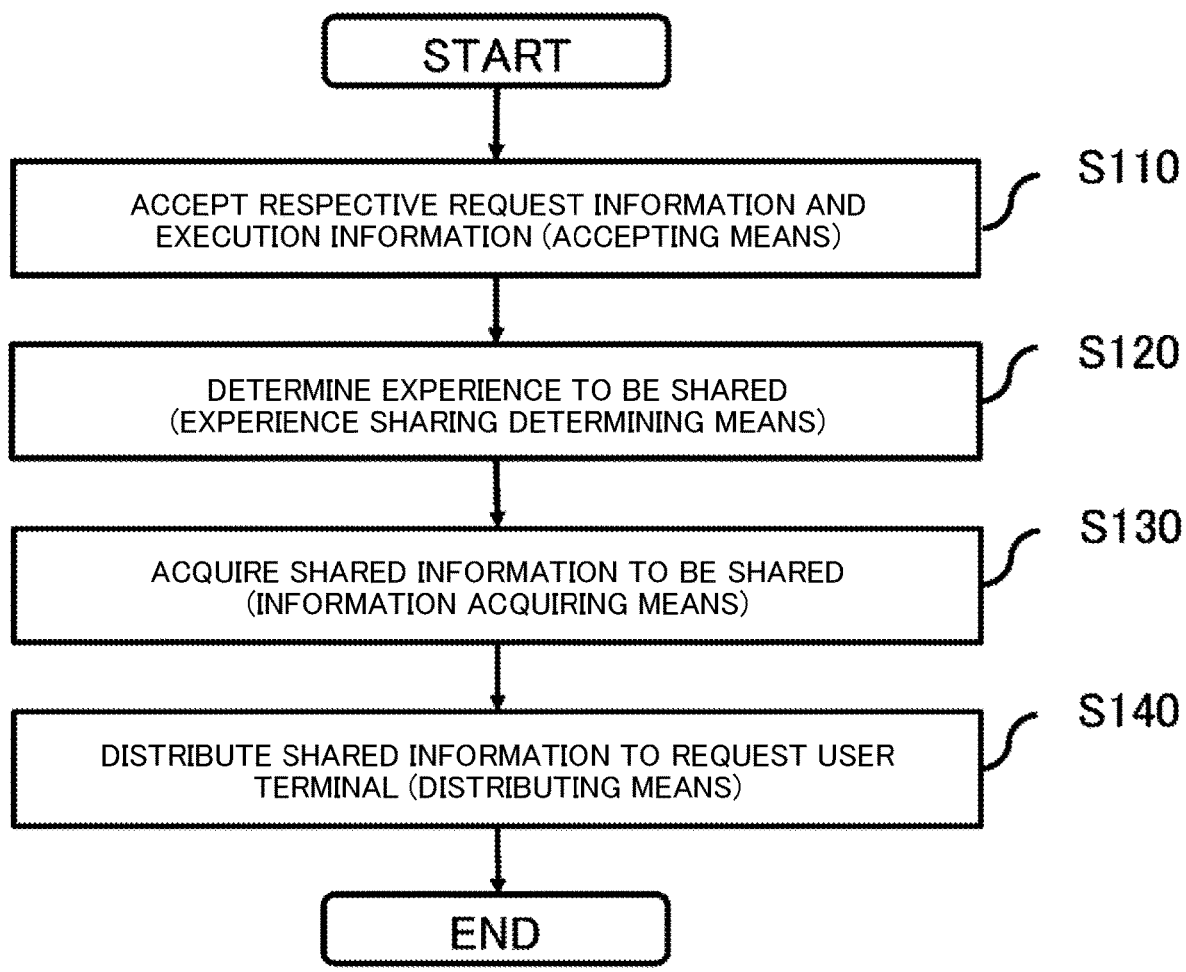
FIG. 5 is a flowchart depicting an example of operations of the experience sharing system according to the embodiment.

As illustrated in FIG. 5, the accepting unit 11 accepts respective request information related to the request for the experience from the request user terminal 2 and execution information related to performing the experience from the execution user terminal 3 (the accepting means S110).

Here, FIG. 7 illustrates examples of the data tables of the request information and the execution information accepted by the accepting unit 11 accepted from the request user terminal 2 and the execution user terminal 3 to the accepting unit 11.

FIG. 7(*a*) is the request information stored in the experience sharing database 1*a* and accepted from the request user terminal 2 according to the embodiment. FIG. 7(*b*) is an example of the execution information stored in the experience sharing database 1*a* and accepted by the execution user terminal 3 according to the embodiment.

In the request information illustrated in FIG. 7(*a*), for example, a "request user ID" to identify the request user or the request user terminal 2, a "name" and an "address" for identification as the request user, and an "e-mail address" used for, for example, a contact for sharing the experience are stored. Furthermore, as the request information, information such as a "location," a "time," a "language," and a "compensation," is transmitted from the request user terminal 2 to the accepting unit 11 via the network 4.

<Experience Sharing Determining Means S120>

Next, based on the request information accepted by the request user terminal 2 and the execution information accepted by the execution user terminal 3, the experience to be shared between the request user terminal 2 and the execution user terminal is determined (the experience sharing determining means S120). The experience sharing determining unit 12 may configure the request information and the execution information accepted by the accepting unit 11 in a format, for example, such that the request user or the execution user can perform the comparison and make the determination easily and can make the determination via the request user terminal 2 and the execution user terminal 3. Further, for example, depending on a priority, a degree of match, or the like of each item, the request user terminal 2 may be matched with the execution user terminal 3.

The experience sharing determining unit 12, for example, may transmit determination information, such as content and conditions of the experience determined in the request user terminal 2 and the execution user terminal 3 to the request user terminal 2 and the execution user terminal 3. The experience determined by the experience sharing determining unit 12 may be, for example, a plan in the future. In the case, the experience sharing determining unit 12, for example, may transmit a contact for a reminder on, for example, the previous day of the day of experience that has been already determined to the request user terminal 2 and the execution user terminal 3 and distribute it from the distributing unit 14.

According to the embodiment, when the accepting unit 11 accepts the request information in which the conditions related to the location and the time at which the experience is shared are described and the execution information in which the location and the time at which the experience can be performed are described, the experience sharing determining unit 12 performs matching of the request user terminal 2 with the execution user terminal 3 based on them and determines the experience to be shared.

<Information Acquiring Means S130>

When the execution user terminal 3 acquires the shared information including the voice or the image to share the experience determined in the experience sharing determining means S120, the information acquiring unit 13 acquires it (the information acquiring means S130).

The information acquiring unit 13 successively acquires the voice or the image imaged by the execution user terminal 3 on the spot based on the request information and the execution information determined by the experience sharing determining unit 12. The information acquiring unit 13 may store, for example, the acquired voice or image associated with the request information or the execution information related to the acquisition of the shared information in the experience sharing database 1*a*.

According to the embodiment, the information acquiring unit 13 acquires various kinds of value data, such as a distance, location information, a shape, a depth, a size, a material, coloring, a temperature, and infrared, related to the photographed subject as the imaging target or the object measured or gauged by the sensor in the execution user terminal 3. For example, a 3D video may be generated with the acquired value data, and the generated 3D video may be distributed to the execution user terminal 3 or the request user terminal 2 as the shared information.

Thus, the request user terminal 2 allows appreciation of the actual video on the spot in a virtual space as a virtual video generated with 3D data in another format.

<Distributing Means S140>

The distributing unit 14 distributes the shared information acquired by the information acquiring unit 13 to the request user terminal 2 (the distributing means S140). The distributing unit 14 distributes the shared information acquired by the information acquiring unit 13 to the request user terminal 2 according to the request information and the execution information determined by the experience sharing determining unit 12. For example, the distributing unit 14 may, for example, adjust the distribution of the shared information of the voice or the image on the spot acquired by the information acquiring unit 13 as if the request user were able to experience the atmosphere on the spot in real-time and distribute it to the request user who watches the shared information via the request user terminal 2.

For example, a distribution destination and the number of distribution destinations of the shared information by the distributing unit 14 may be plural. Furthermore, a plurality of pieces of the distributed different shared information may be combined to one request user terminal 2 and distributed to ensure watching. The distribution allows the request user to simultaneously refer to a related place and content and to refer to different scenes and angles multidirectionally, thus ensuring further enjoying the experience on the spot.

Thus, for example, the distributing unit 14 distributes the shared information on the spot acquired by the information acquiring unit 13 to the request user terminal 2 and the operation of the experience sharing system 100 according to the embodiment terminates.

(First Modification of Operations of Experience Sharing System 100)

Next, the first modification of the experience sharing system 100 according to the embodiment will be described.

Differences between the above-described example of the operation and the first modification is that the state information related to the state of the voice or the image included in the shared information is acquired in the information acquiring means S130, and in distributing means S140, the voice or the image in the shared information is adjusted based on the state information acquired by the information acquiring unit 13 and the voice or the image is distributed to the request user terminal 2. Note that description of the content similar to the above-described example of the operations will be omitted.

According to the embodiment, the information acquiring unit 13 acquires the state information related to the voice or the image included in the shared information. The state information shows, for example, a state whether the voice or the image is normally reached, a state of a magnitude of radio wave, a transfer speed of the image, and a state of delay. It can be determined from the state information whether the shared information can be acquired between the request user terminal 2 and the execution user terminal 3 without any problem.

According to the embodiment, the information acquiring unit 13, for example, may acquire the state whether the voice or the image is normally reached, the state of the magnitude of the radio wave, the transfer speed of the image, and the state of delay from the respective request user terminal 2 and execution user terminal 3. The information acquiring unit 13 may acquire a reference value, a correction value regarding the adjustment, a parameter, and the like in a state where the acquired data is preliminarily held in the experience sharing database, from the data table (not illustrated).

Next, based on the state information and the correction value acquired by the information acquiring unit 13, the distributing unit 14 adjusts, for example, the intensity of the voice or a color shade of the image in the shared information and directivity of an antenna and distributes the adjusted shared information to the request user terminal. Thus, the distributing unit 14 avoids an influence due to congestion of the radio wave, a trouble in a base station, and a line speed, thus ensuring the distribution of the stabilized, high-quality shared information.

Thus, the operations of the first modification of the experience sharing system 100 according to the embodiment in which, for example, the information acquiring unit 13 acquires the state information included in the shared information and the distributing unit 14 adjusts the voice or the image in the shared information based on the state information acquired by the information acquiring unit 13 and distributes it to the request user terminal 2 terminate.

Next, a second modification and a third modification of the experience sharing systems 100 according to the embodiment will be described.

Differences between the example of the operations and the first modification described above; and the second modification and the third modification are in that, in the distributing means S140, the situation information related to the situation of the location where the shared information is acquired by the execution user terminal 3 is distributed to the request user terminal 2 or the execution user terminal 3 (the second modification) and in the distributing means S140, the identification information related to the content of the shared information acquired by the execution user terminal 3 is distributed to the request user terminal 2 or the execution user terminal 3 (the third modification). Note that description of the content similar to the above-described example of the operations will be omitted.

According to the embodiment (the second modification), the location where the shared information is acquired by the execution user terminal 3 may be, for example, acquired together with the shared information by the GPS function provided with the execution user terminal 3 or the information acquiring unit 13 sequentially or by the information acquiring unit 13 at a regular interval. This allows identifying the location where the shared information is acquired by the execution user terminal 3.

Next, the distributing unit 14, for example, acquires the situation information related to the situation of the identified location of the execution user terminal 3 from the experience sharing database 1a and distributes it to the request user terminal 2 or the execution user terminal 3. The situation information distributed to the request user terminal 2 or the execution user terminal 3, for example, may be distributed such that different pieces of information are distributed according to the location of the request user terminal or the execution user terminal 3.

Figure 6B:
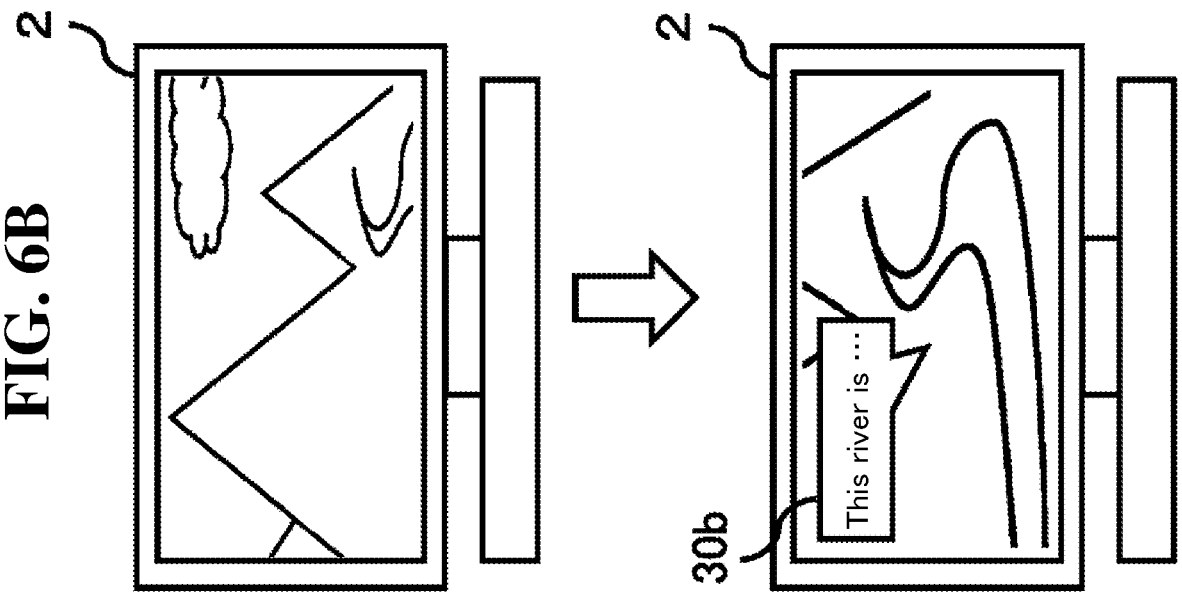
FIG. 6(a) and FIG. 6(b) are schematic diagrams of a second modification of the experience sharing system according to the embodiment.
Figure 6A:
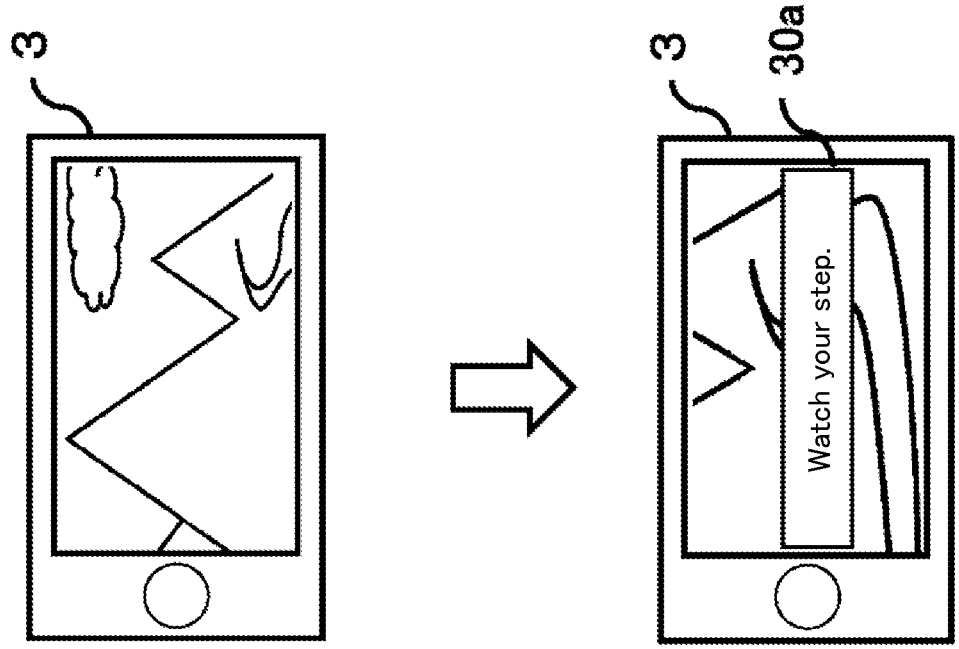

Here, using FIG. 6(a) and FIG. 6(b), the second modification of the experience sharing system 100 according to the embodiment will be described. FIG. 6(a) and FIG. 6(b) are schematic diagrams of the second modification of the experience sharing system 100 according to the embodiment.

As described above, the distributing unit 14 distributes the situation information related to the situation of the location where the shared information is acquired by the execution user terminal 3 to the request user terminal 2 or the execution user terminal 3. In this case, the same shared information is displayed in the execution user terminal 3 and the request user terminal 2. As illustrated in FIG. 6(a), for example, in a case where the location where the execution user terminal 3 images the shared information is close to a river, the distributing unit 14 acquires situation information 30a "Watch your step." from a situation information data table (not illustrated) preliminarily stored in the experience sharing database and distributes it to the target execution user terminal 3. Meanwhile, as illustrated in FIG. 6(b), the request user terminal 2, for example, acquires situation information 30b, such as "This river is . . . " from the situation information data table (not illustrated) preliminarily stored in the experience sharing database as the information describing the shared information and distributes it to the request user terminal 2.

According to the embodiment, the experience sharing database 1a preliminarily stores the location information of the shared information imaged by the execution user terminal and the target situation information stored made correspond to the location information. With the location information included in the shared information imaged by the execution user terminal 3, the distributing unit 14 adds the situation information 30a and the situation information 30b to distribution information distributed to the request user terminal 2 and the execution user terminal 3 and distributes it.

Thus, for example, the distributing unit 14 distributes the pieces of the situation information different between the request user terminal 2 and the execution user terminal 3, and the operations of the experience sharing system 100 in the embodiment (the second modification) terminate.

According to the embodiment (the third modification), the distributing unit 14 distributes the identification information related to the content of the shared information by the execution user terminal 3 to the request user terminal 2 or the execution user terminal 3. In addition to the location information related to the shared information, the experience sharing database 1a in the experience sharing server 1 stores (not illustrated), for example, a plurality of similar images as similar images which are similar, together with identification information, such as an explanation related to the shared information. For example, the experience sharing database 1a stores the identification information including identification codes attached to the images, descriptions corresponding to the identification codes, and data of notes. Based on the shared information acquired by the information acquiring unit 13, whether an image similar to the acquired shared information is stored in the experience sharing database 1a is identified and the related identification information is acquired.

According to the content of the shared information imaged by the execution user terminal 3, the distributing unit 14 refers to an image similar to an image, for example, "the souvenir shop in the park" or the identification code made correspond to the location corresponding to the shared information, and acquires the identification information distributed to the request user terminal 2.

The identification information distributed from the distributing unit 14 to the request user terminal 2 may be, for example, "the price of the souvenir" and "the code information related to the purchase." The identification information distributed to the execution user terminal 3 may be, for example, identification information to guide the spot, such as "Another souvenir shop is 100 m ahead.", and a person who performs the execution user terminal 3 may orally input the identification information with a microphone of the execution user terminal 3 and deliver it to a client via, for example, a speaker of the request user terminal 2.

Thus, the distributing unit 14 distributes the identification information related to the content of the acquired shared information so as to differentiate the request user terminal 2 or the execution user terminal 3 to ensure the distribution of the identification information according to the respective locations and objects.

Accordingly, for example, the distributing unit 14 distributes the situation information different between the request user terminal 2 and the execution user terminal 3, and the operations of the experience sharing system 100 in the embodiment (the third modification) terminate.

According to the embodiment (the second modification), the location where the shared information is acquired by the execution user terminal 3 may be, for example, acquired together with the shared information by the GPS function provided in the execution user terminal 3 or the information acquiring unit 13 sequentially or by the information acquiring unit 13 at a regular interval. This allows identifying the location where the shared information is acquired by the execution user terminal 3.

According to the embodiment, the accepting unit 11 acquires the language information used in the request user terminal 2 or the execution user terminal 3 (the accepting means S110). The distributing unit 14 includes the translating unit 14a that translates the shared information based on the language information acquired by the accepting unit 11. As illustrated in FIG. 8(a), the translating unit 14a, for example, includes the translation data table stored in the experience sharing database 1a, and, for example, determines a language used in the request user terminal 2 and the execution user terminal 3 based on a voice or a text exchanged between the request user terminal 2 and the execution user terminal 3 (translating means S141).

The translating unit 14a translates, for example, the shared information and the instruction information exchanged between the request user terminal 2 and the execution user terminal 3 based on the language information used in the request user terminal 2 and the execution user terminal 3. The distributing unit 14 distributes it to the request user terminal 2 and the execution user terminal 3.

According to the embodiment, the instruction information transmitting unit 15 transmits the instruction information including the various kinds of instructions to acquire the shared information from the request user terminal 2 to the execution user terminal 3 (instruction information transmitting means S150). For example, as illustrated in FIG. 8(b), the instruction information including the various kinds of instructions is stored in the instruction information data table in the experience sharing database 1a. The instruction information is, for example, preset according to the function of each terminal and device information of, for example, a user interface.

The instruction information transmitting unit 15 refers to the instruction information data table in the experience sharing database 1a based on the instruction information acquired from the request user terminal 2 and transmits the corresponding instruction information to the execution user terminal 3. In view of this, the information acquiring unit 13 allows acquiring the shared information from the execution user terminal 3 via the experience sharing server 1 based on the instruction information from the request user terminal 2.

<Instruction Information Transmitting Means S151 and S152>

According to the embodiment, the instruction information transmitting unit 15 transmits the instruction information including the various kinds of instructions to perform the direct remote operation by the request user terminal 2 to acquire the shared information to the execution user terminal 3 (the instruction information transmitting means S151 and S152).

<Operation Control Means S160>

The operation control unit 16a controls an operation to acquire the shared information based on the instruction included in the instruction information transmitted by the instruction information transmitting unit 15 to the execution user terminal 3 (the operation control means S160).

<Time Slot Control Means S170>

According to the embodiment, the instruction information transmitting unit 15 transmits the instruction information including the instruction related to the time slot to acquire the shared information by the execution user terminal 3 to the execution user terminal 3. The time slot control unit 16b controls the time slot to acquire, for example, the shared information based on the instruction related to the time slot included in the instruction information transmitted by the instruction information transmitting unit 15. The time slot control unit 16b, for example, controls the acquisition of the shared information by the execution user terminal 3 according to time slot information (not illustrated) stored in an instruction data table in the experience sharing database 1a.

The time slot control unit 16b performs control of the time slot for the information acquiring unit 13 to acquire the shared information imaged by the execution user terminal 3 based on the instruction related to the time slot included in the instruction information transmitted by the instruction information transmitting unit 15. Accordingly, based on the instruction information from the request user terminal 2, the shared information according to the time slot can be acquired from the execution user terminal 3 via the experience sharing server 1.

<Photographing Condition Control Means S171>

In the embodiment, the instruction information transmitting unit 15 transmits the instruction information including the instruction related to the location to acquire the shared information by the execution user terminal 3 to the execution user terminal 3. The photographing condition control unit 16c controls a photographing condition to acquire the shared information based on the instruction related to the location included in the instruction information transmitted by the instruction information transmitting unit 15 to the execution user terminal 3 (the photographing condition control means S171).

In the experience sharing database 1a, information related to various kinds of photographing conditions, such as a photographed target, a photographing location, a photographing time, a photographing charge, and a photographing method, are preliminarily stored or registered as, for example, a photographing condition control data table according to the location where the shared information is imaged (not illustrated). The instruction information transmitting unit 15 refers to the photographing condition control data table, acquires the information on the photographing condition related to the acquisition of the shared information related to the location, and transmits it to the execution user terminal 3.

The photographing condition control unit 16c of the execution user terminal 3 performs control based on the photographing condition to acquire the shared information in the execution user terminal 3 based on the instruction related to the location included in the instruction information transmitted by the instruction information transmitting unit 15.

<Distinguishing Means S180>

According to the embodiment, the distinguishing unit 20 distinguishes the person image, the product image, or the structural image from the shared information including the image acquired by the information acquiring unit 13 (the distinguishing means S180). For example, various kinds of images stored in the experience sharing database 1a, an image for masking, such as an icon and a character, and a substitution image, such as a mosaic, are stored in a substitution image data table (not illustrated). The distinguishing unit 20 refers to the image acquired by the information acquiring unit 13 and the experience sharing database 1a, distinguishes whether the image is the target image by, for example, the known similar image technique, and acquires the target substitution image.

<Image Processing Unit 21>

The image processing unit 21 performs masking or pastes the substitution image on the region of the relevant image by the result of the distinction on a part of or the entire person image, product image, or structural image distinguished based on the result of the distinction by the distinguishing unit 20 and the acquired substitution image (image processing means S190). The pasting of the substitution image by the image processing unit 21 may be, for example, mosaic display and avatar display, and allows protecting the privacy of each of the client of the request user terminal 2 and the execution person of the execution user terminal 3. Furthermore, this also can avoid careless, unauthorized imaging of, for example, a general person on the site or the spot, a specific product, a construction for which permission for photographing is necessary, and a natural object.

According to the embodiment, the accepting unit 11 accepts request information in which the condition including the compensation to be paid for the request is described and execution information in which the desired compensation for performing the experience is described. The experience sharing determining unit 12 determines the experience to be shared based on the compensations described in the respective request information and execution information accepted by the accepting unit 11. The information acquiring unit 13 is allowed to acquire the shared information after the experience sharing determining unit 12 determines the experience to be shared between the request user terminal 2 and the execution user terminal 3 and the request user terminal 2 or the execution user terminal 3 makes a payment for the compensation. This allows reliable request and execution and collection of the compensation.

According to the embodiment, the information acquiring unit 13 may acquire various kinds of body value data, such as a posture, a body temperature, and the number of respirations of a person in need of nursing care, an old person, or the like measured or gauged by the execution user terminal 3. The distinguishing unit 20 distinguishes the state of, for example, the person in need of nursing care and the old person based on the various kinds of body value data, such as the posture, the body temperature, and the number of respirations of the person in need of nursing care, the old person, or the like acquired by the information acquiring unit 13. The image processing unit 21 converts the state of, for example, the person in need of nursing care and the old person distinguished by the distinguishing unit 20 into, for example, a 3D video. The distributing unit 14 may distribute the shared information converted into the 3D video to the request user terminal 2 of, for example, a caregiver, such as the relative, and a nurse in a nursing home.

Thus, while privacy of the person in need of nursing care or the old person is ensured, the state of, for example, the person in need of nursing care and the old person can be remotely grasped, ensuring the support.

According to the embodiment, the execution user terminal 3 may request the request user terminal 2 having professional information and knowledge via the experience sharing server 1 for a work, such as confirmation and check of the shared information imaged on the site or the spot. The execution user terminal 3 images an image to which advice or the like is desired to be given, and the image is distributed to the request user terminal 2 as the shared information via the experience sharing server 1.

Thus, the execution user terminal 3, for example, causes the request user terminal 2 to remotely confirm the product that is desired to be purchased by his/her own, thus ensuring purchasing the appropriate product or the like.

According to the embodiment, the experience sharing server 1 may accept a work, such as being at the site or the spot, or what work can be performed, as the execution information from the execution user terminal 3, and the execution information may be open to the request user terminals 2 registered in the experience sharing server 1. The experience sharing server 1 may accept the request information from the request user terminal 2. The experience sharing determining unit 12 determines the request user terminal 2 that matches the execution information accepted by the execution user terminal 3, and thus, the execution user terminal 3 performs the work of the confirmation of the state of imaging on the site and the spot and imaging, such as investigation.

According to the embodiment, in addition to imaging, for example, the work by the execution user terminal 3 may be a work, such as "Please stand in line." and "Please check for lost items." and the situation may be imaged as the shared information. The information acquiring unit 13 of the experience sharing server 1 acquires the shared information imaged by the execution user terminal 3 and the distributing unit 14 distributes the shared information to the request user terminal 2.

According to the embodiment, an execution person who carries the execution user terminal 3, for example, stays on the spot so that the execution person can undertake a work, such as imaging an image unique to the spot according to the request user terminal 2 at the remote location. The distribution is made to the request user terminal 2 via the experience sharing server 1. The request user who carries the request user terminal 2 refers to a shared image distributed by the distributing unit 14 of the experience sharing server 1 to ensure experience of teleportation that creates a pseudo movement while staying at a remote location.

While the embodiments of the present invention have been described, the embodiments have been presented as examples, and are not intended to limit the scope of the invention. The novel embodiments described herein can be embodied in a variety of other configurations. Various omissions, substitutions and changes can be made without departing from the gist of the invention. The embodiments and the modifications thereof are within the scope and the gist of the invention and within the scope of the inventions described in the claims and their equivalents.

DESCRIPTION OF REFERENCE SIGNS

1: Experience sharing server
1a: Experience sharing database
2, 2a, 2b: Request user terminal
3, 3a, 3b: Execution user terminal
4: Network
10: Housing
11: Reception unit
12: Experience sharing determination unit
13: Information acquiring unit
14: Distributing unit
14a: Translating unit
15: Instruction information transmitting unit
16a: Operation control unit
16b: Time slot control unit
16c: Photographing condition control unit
20: Distinguishing unit
21: Image processing unit
22: Output unit
30a: Situation information A
30b: Situation information B
50: Scene
100: Experience sharing system
101: CPU
102: ROM
103: RAM
104: Storage unit
105: I/F
106: I/F
107: I/F
108: Input part
109: Output part
110: Internal bus
S110, S111: Accepting means
S120: Experience sharing determining means
S130: Information acquiring means
S140, S142: Distributing means
S141: Translating means
S150, S151, S152: Instruction information transmitting means
S160: Operation control means
S170: Time slot control means
S171: Photographing condition control means
S180: Distinguishing means
S190: Image processing means
FIG. 1
1 EXPERIENCE SHARING SERVER
1a EXPERIENCE SHARING DATABASE
2(2a) REQUEST USER TERMINAL
2(2b) REQUEST USER TERMINAL
3(3a) EXECUTION USER TERMINAL
3(3b) EXECUTION USER TERMINAL
FIG. 3
109 OUTPUT PART
108 INPUT PART
FIG. 4
11 ACCEPTING UNIT
12 EXPERIENCE SHARING DETERMINING UNIT
13 INFORMATION ACQUIRING UNIT
14 DISTRIBUTING UNIT
14a TRANSLATING UNIT
15 INSTRUCTION INFORMATION TRANSMITTING UNIT
16a OPERATION CONTROL UNIT
16c PHOTOGRAPHING CONDITION CONTROL UNIT
20 DISTINGUISHING UNIT
22 OUTPUT UNIT
104 STORAGE UNIT
16b TIME SLOT CONTROL UNIT
21 IMAGE PROCESSING UNIT
FIG. 5
S110 ACCEPT RESPECTIVE REQUEST INFORMATION AND EXECUTION INFORMATION (ACCEPTING MEANS)
S120 DETERMINE EXPERIENCE TO BE SHARED (EXPERIENCE SHARING DETERMINING MEANS)
S130 ACQUIRE SHARED INFORMATION TO BE SHARED (INFORMATION ACQUIRING MEANS)
S140 DISTRIBUTE SHARED INFORMATION TO REQUEST USER TERMINAL (DISTRIBUTING MEANS)
FIG. 6(a)
30a Watch your step.
FIG. 6(b)
30b This river is . . .
FIG. 7(a)
REQUEST USER ID
NAME
ADDRESS
E-MAIL ADDRESS
REQUEST INFORMATION
LOCATION
TIME
LANGUAGE
COMPENSATION
FIG. 7(b)
EXECUTION USER ID
NAME
ADDRESS
E-MAIL ADDRESS
EXECUTION INFORMATION
LOCATION
TIME
LANGUAGE
COMPENSATION
FIG. 8(a)
LANGUAGE A
LANGUAGE B
FIG. 8(b)
INSTRUCTION A
RIGHT
INSTRUCTION B
LEFT

The invention claimed is:

1. An experience sharing system for sharing an experience while a request user terminal and an execution user terminal are communicatively connected via a network, the experience sharing system comprising:
a hardware processor; and
a non-transitory computer-readable medium having stored thereon executable instructions that, when executed by the hardware processor, cause the experience sharing system to function as:
accepting means configured to accept each of request information related to a request of the experience of remote location images from the request user terminal and execution information related to performing the experience on spot location images from the execution user terminal;
experience sharing determining means configured to determine that the request user terminal and the execution user terminal share the experience based on whether there is a match between pieces of information including at least any of locations and times included in the request information and the execution information;
information acquiring means configured to acquire: (i) shared information including a voice or an image on the spot location to share the experience between the request user terminal and the execution user terminal; and (ii) situation information related to a location on the spot of the shared information based on the shared information where the shared information was imaged; and
distributing means configured to distribute: (i) the shared information to the request user terminal in real time such that a display of the request user terminal becomes the same as a display of the shared information in the execution user terminal; (ii) the situation information to the execution user terminal in real time such that the situation information is displayed only in the execution user terminal; and (iii) coupon information of a newly opened store to the request user terminal if the location is the newly opened store according to the location where the shared information was imaged, or if the location is prohibited, information regarding the location or precautions or restrictions regarding the location to the execution user terminal,
wherein the experience sharing determining means is further configured to, when the accepting means accepts the request information in which a condition related to a location and a time at which the experience is shared is described and the execution information in which a location and a time at which the experience is allowed to be performed is described: (i) perform matching of the request user terminal and the execution user terminal based on the location and the time at which the experience is shared and the location and the time at which the experience is allowed to be performed; and (ii) determine that the request user terminal and the execution user terminal share the experience.

2. The experience sharing system according to claim 1, wherein:
the information acquiring means is further configured to acquire state information related to a state of the voice or the image included in the shared information; and
the distributing means is further configured to: (i) adjust the voice or the image; and (ii) distribute the voice or the image to the request user terminal.

3. The experience sharing system according to claim 1, wherein
the distributing means is further configured to distribute identification information related to content of the shared information to the request user terminal or the execution user terminal.

4. The experience sharing system according to claim 1, wherein:

the accepting means is further configured to acquire language information used in the request user terminal or the execution user terminal; and
the distributing means:
includes a translating unit configured to translate the shared information based on the language information; and
is further configured to distribute the shared information translated by the translating unit to the request user terminal.

5. The experience sharing system according to claim 1, wherein:
the executable instructions, when executed by the hardware processor, cause the experience sharing system to further function as instruction information transmitting means configured to transmit instruction information to the execution user terminal, and the instruction information includes instructions to acquire the shared information from the request user terminal,
the information acquiring means is further configured to acquire the shared information from the execution user terminal based on the instruction information from the request user terminal.

6. The experience sharing system according to claim 5, wherein:
the instruction information transmitting means is further configured to transmit additional instruction information to the execution user terminal, and the additional instruction information includes instructions for the request user terminal to perform a direct remote operation to acquire the shared information; and
the execution user terminal includes an operation control unit which is configured to control an operation to acquire the shared information based on one of the instructions included in the additional instruction information.

7. The experience sharing system according to claim 5, wherein:
the instruction information transmitting means is further configured to transmit additional instruction information to the execution user terminal, and the additional instruction information includes an instruction related to a time slot to acquire the shared information by the execution user terminal; and
the execution user terminal includes a time slot control unit which is configured to control the time slot to acquire the shared information based on the instruction included in the additional instruction information.

8. The experience sharing system according to claim 5, wherein:
the instruction information transmitting means is further configured to transmit additional instruction information to the execution user terminal, and the additional instruction information includes an instruction related to the location to acquire the shared information by the execution user terminal; and
the execution user terminal includes a photographing condition control unit which is configured to control a photographing condition to acquire the shared information based on the instruction included in the additional instruction information.

9. The experience sharing system according to claim 5, wherein:
the instruction information transmitting means is further configured to: (i) transmit additional instruction information to the execution user terminal, and the additional instruction information includes an instruction related to a time slot to acquire the shared information by the execution user terminal or an instruction related to a location to acquire the shared information by the execution user terminal; and (ii) if the execution user terminal, which has transmitted the additional instruction information, is determined not to be able to acquire the shared information based on the instruction related to the time slot or the instruction related to the location, search for another execution user terminal that allows acquiring of the shared information based on the instruction related to the time slot or the instruction related to the location and transmit the additional instruction information to the other execution user terminal.

10. The experience sharing system according to claim 1, wherein the executable instructions, when executed by the hardware processor, cause the experience sharing system to further function as:
   distinguishing means configured to distinguish a person image, a product image, or a structural image from the image included in the shared information; and
   image processing means configured to: (i) mask the person image, the product image, or the structural image; or (ii) paste a substitution image on a region of the image included in the shared information.

11. The experience sharing system according to claim 1, wherein:
   the accepting means is further configured to accept the request information in which a condition including a compensation to be paid for the request is described and the execution information in which a desired compensation for performing the experience is described;
   the experience sharing determination means is further configured to determine that the request user terminal and the execution user terminal share the experience based on whether there is a match between the compensation to be paid for the request and the desired compensation for performing the experience; and
   the information acquiring means is further configured to acquire the shared information after the experience sharing determination means determines that the request user terminal and the execution user terminal share the experience and a payment for the compensation has been made.

12. An experience sharing method for sharing an experience between a request user terminal and an execution user terminal communicatively connected via a network, the experience sharing method comprising:
   accepting each of request information related to a request of the experience of remote location images from the request user terminal and execution information related to performing the experience on spot location images from the execution user terminal;
   determining that the request user terminal and the execution user terminal share the experience based on whether there is a match between pieces of information including at least any of locations and times included in the request information and the execution information;
   acquiring: (i) shared information including a voice or an image on the spot location to share the experience between the request user terminal and the execution user terminal; and
   (ii) situation information related to a location on the spot of the shared information based on the shared information where the shared information was imaged; and
   distributing: (i) the shared information to the request user terminal in real time such that a display of the request user terminal becomes the same as a display of the shared information in the execution user terminal; (ii) the situation information to the execution user terminal in real time such that the situation information is displayed only in the execution user terminal, and
   (iii) coupon information of a newly opened store to the request user terminal if the location is the newly opened store according to the location where the shared information was imaged, or if the location is prohibited, information regarding the location or precautions or restrictions regarding the location to the execution user terminal,
   wherein, when the request information in which a condition related to a location and a time at which the experience is shared is described and the execution information in which a location and a time at which the experience is allowed to be performed is described are accepted: (i) matching of the request user terminal and the execution user terminal based on the location and the time at which the experience is shared and the location and the time at which the experience is allowed to be performed; and (ii) determining that the request user terminal and the execution user terminal share the experience.

13. The experience sharing system according to claim 2, wherein
   the distributing means is further configured to distribute identification information related to content of the shared information to the request user terminal or the execution user terminal.

14. The experience sharing system according to claim 2, wherein:
   the accepting means is further configured to acquire language information used in the request user terminal or the execution user terminal; and
   the distributing means:
      includes a translating unit configured to translate the shared information based on the language information; and
      is further configured to distribute the shared information translated by the translating unit to the request user terminal.

15. The experience sharing system according to claim 2, wherein the executable instructions, when executed by the hardware processor, cause the experience sharing system to further function as:
   distinguishing means configured to distinguish a person image, a product image, or a structural image from the image included in the shared information; and
   image processing means configured to: (i) mask the person image, the product image, or the structural image; or (ii) paste a substitution image on a region of the image included in the shared information.

16. The experience sharing system according to claim 2, wherein:
   the accepting means is further configured to accept the request information in which a condition including a compensation to be paid for the request is described and the execution information in which a desired compensation for performing the experience is described;
   the experience sharing determination means is further configured to determine that the request user terminal and the execution user terminal share the experience based on whether there is a match between the compensation to be paid for the request and the desired compensation for performing the experience; and the information acquiring means is further configured to acquire the shared information after the experience sharing determination means determines that the request user terminal and the execution user terminal share the experience and a payment for the compensation has been made.

\* \* \* \* \*